No. 792,609. PATENTED JUNE 20, 1905.
O. B. PHILLIPS.
VENDING MACHINE.
APPLICATION FILED FEB. 8, 1904.
8 SHEETS—SHEET 1.
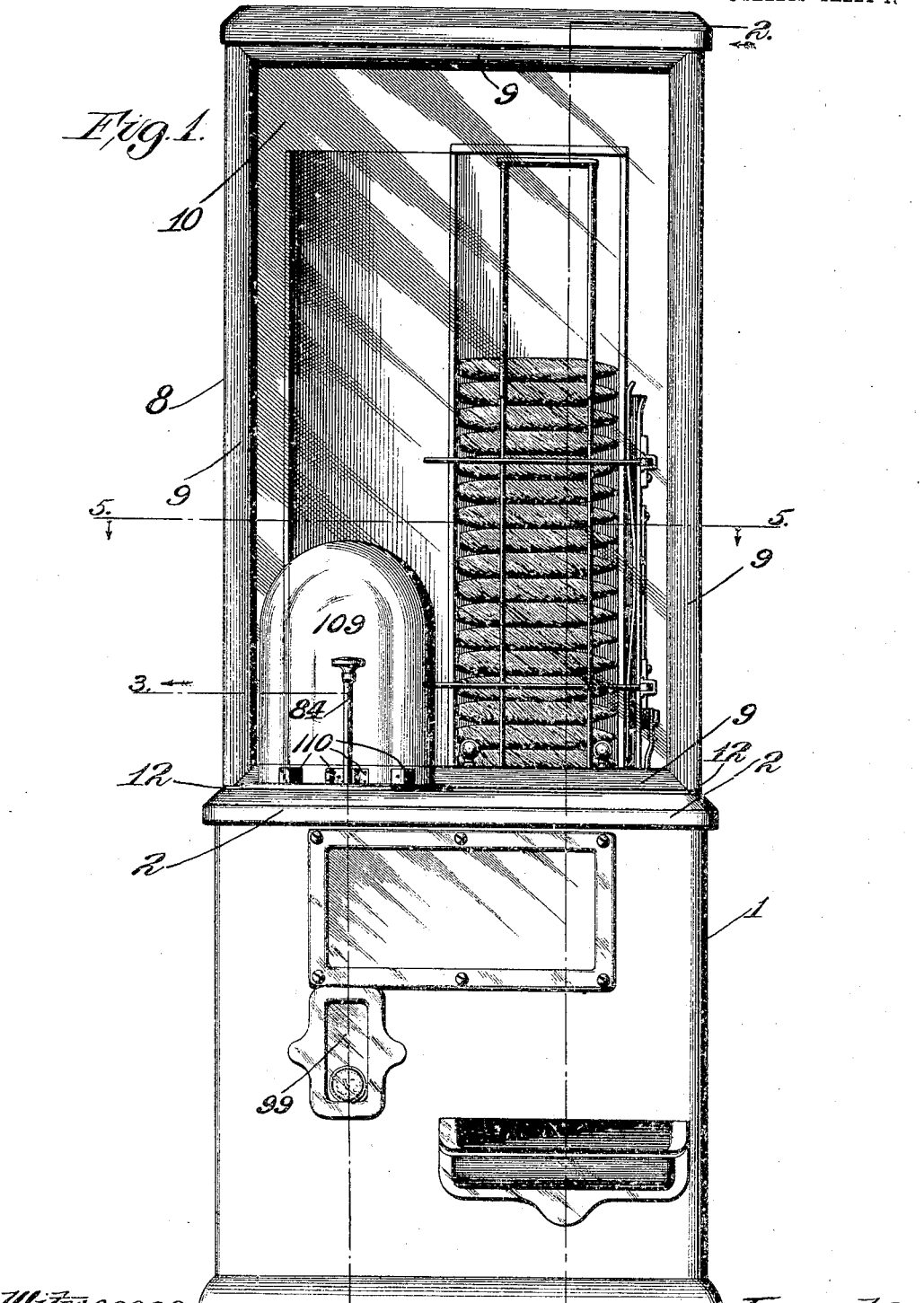

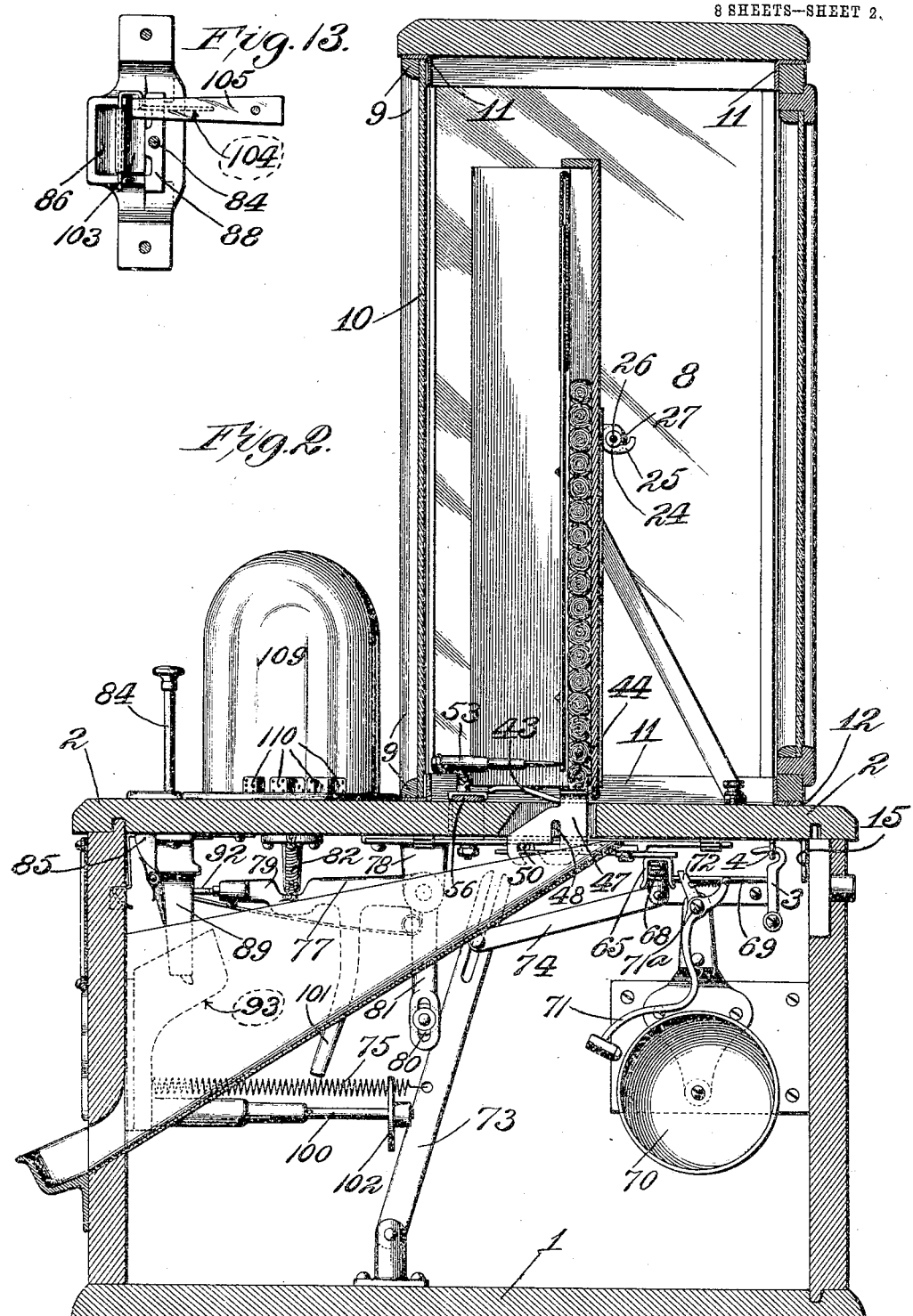

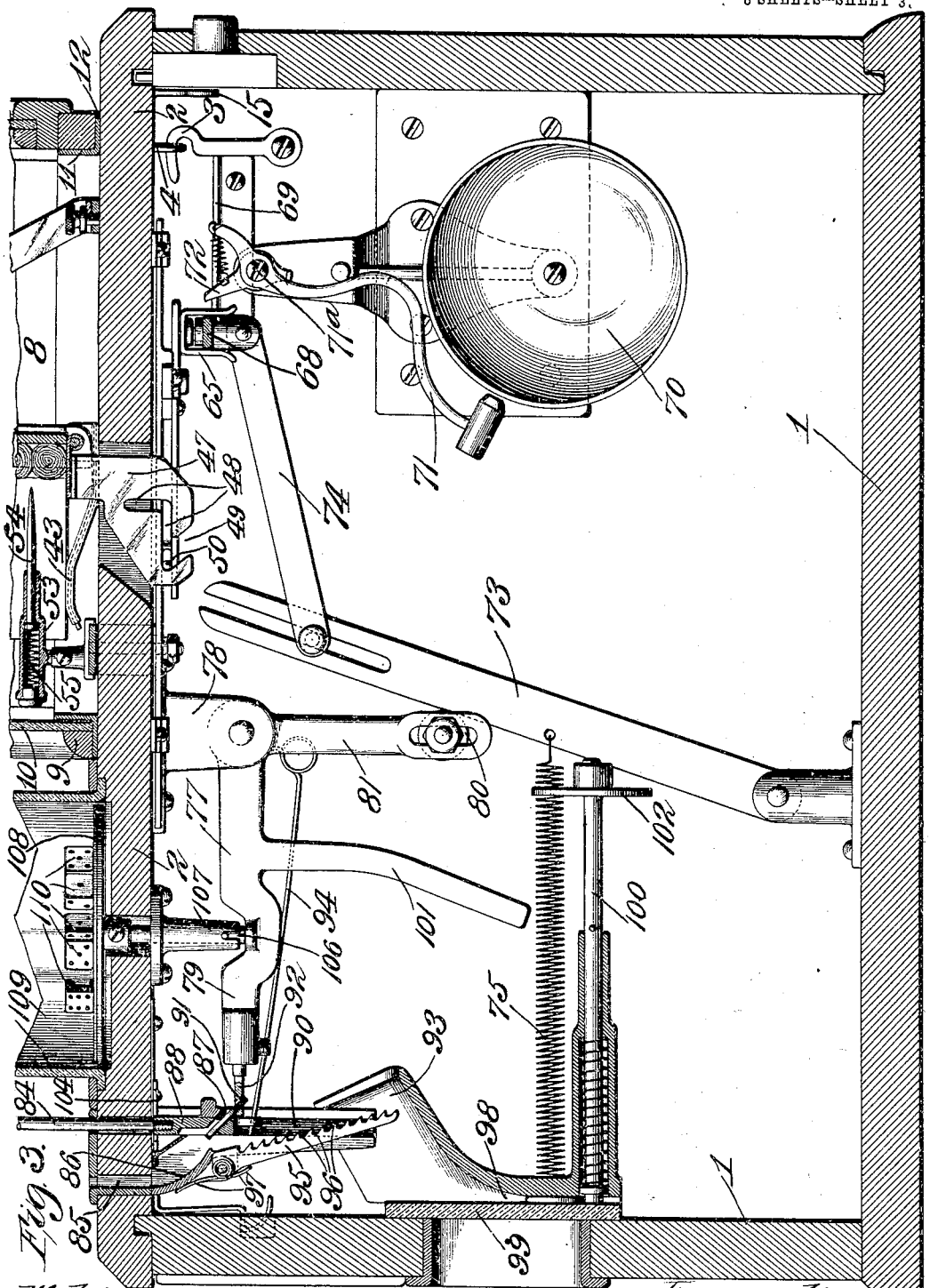

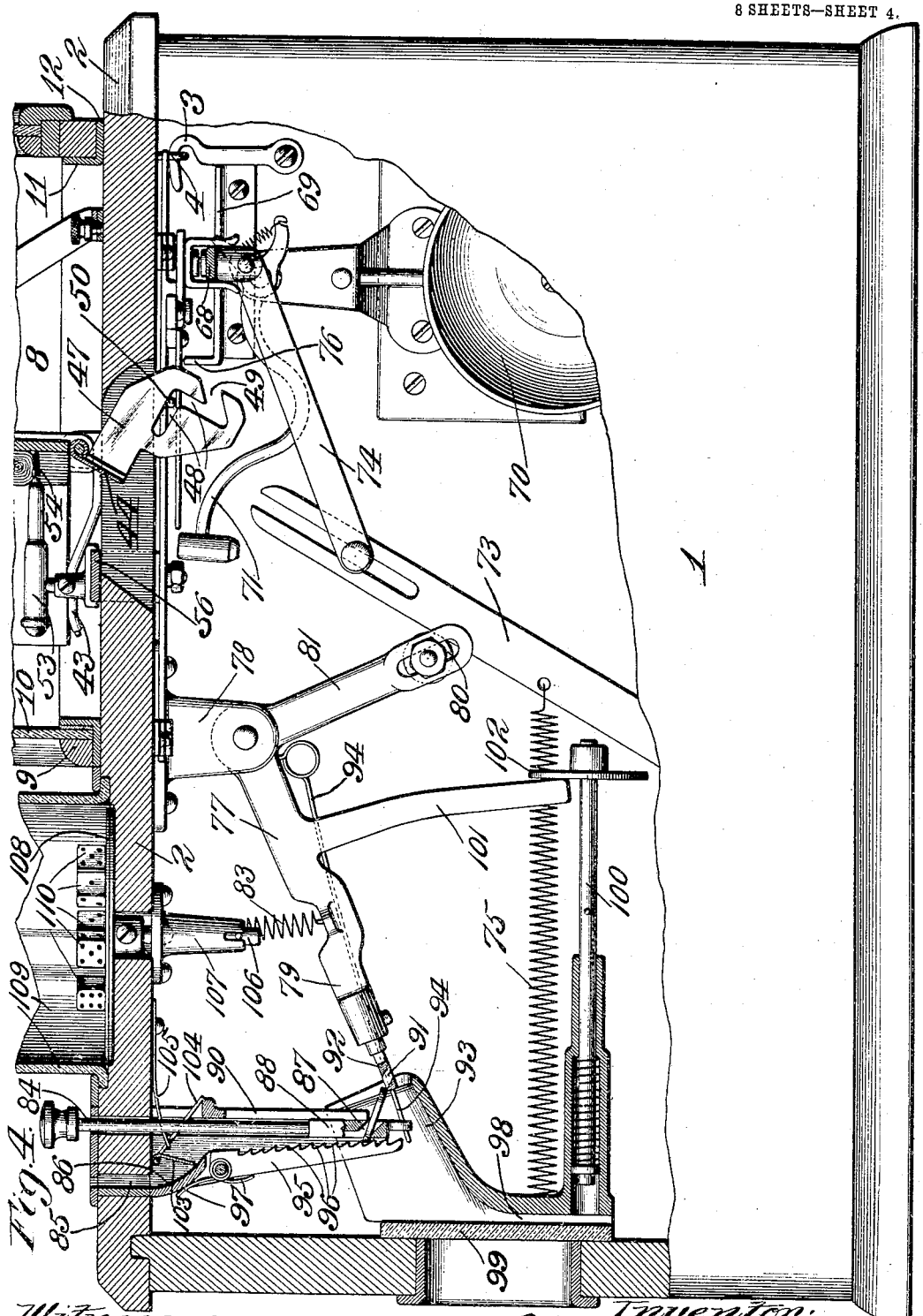

No. 792,609. PATENTED JUNE 20, 1905.
O. B. PHILLIPS.
VENDING MACHINE.
APPLICATION FILED FEB. 8, 1904.
8 SHEETS—SHEET 5.
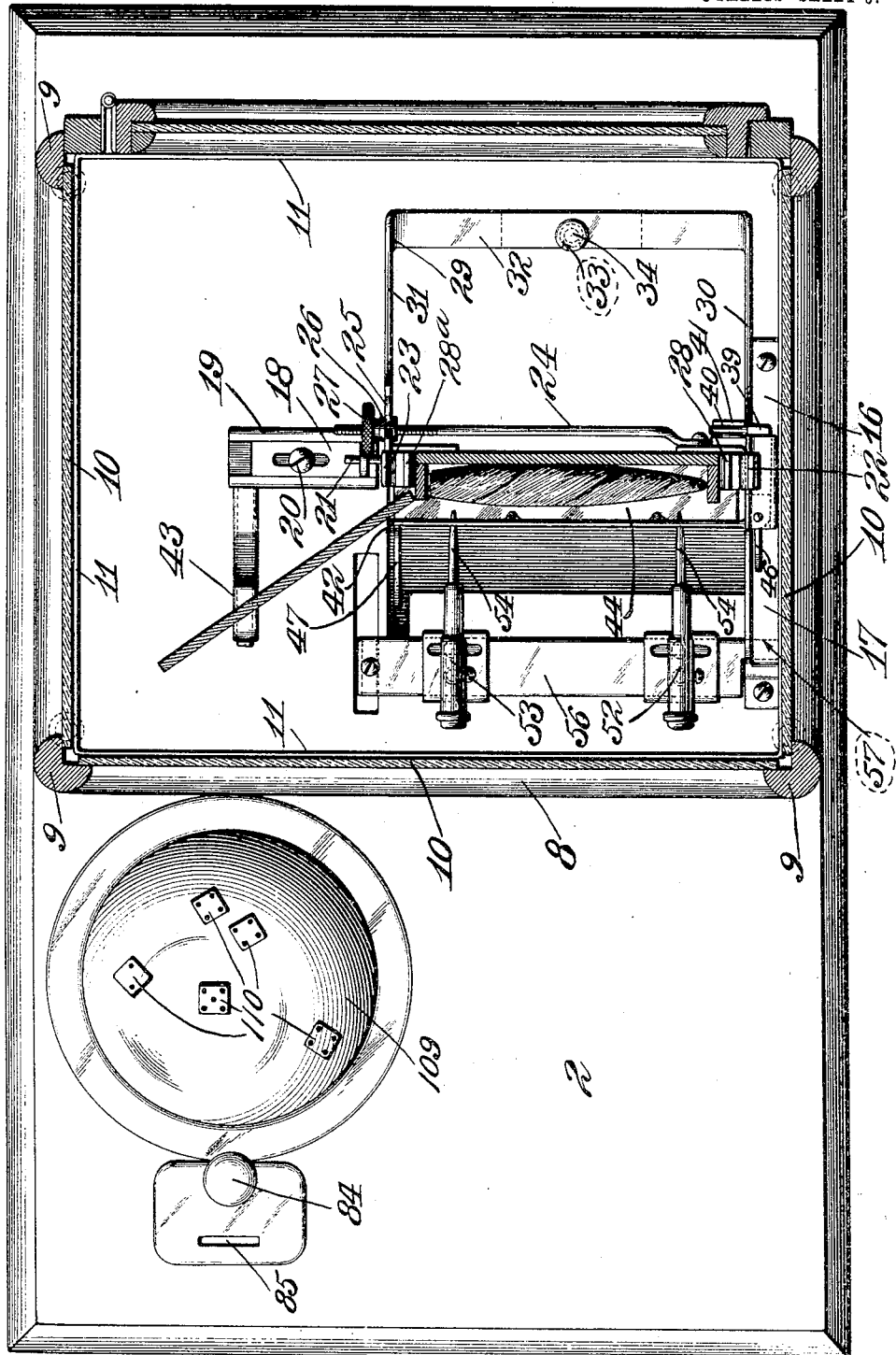

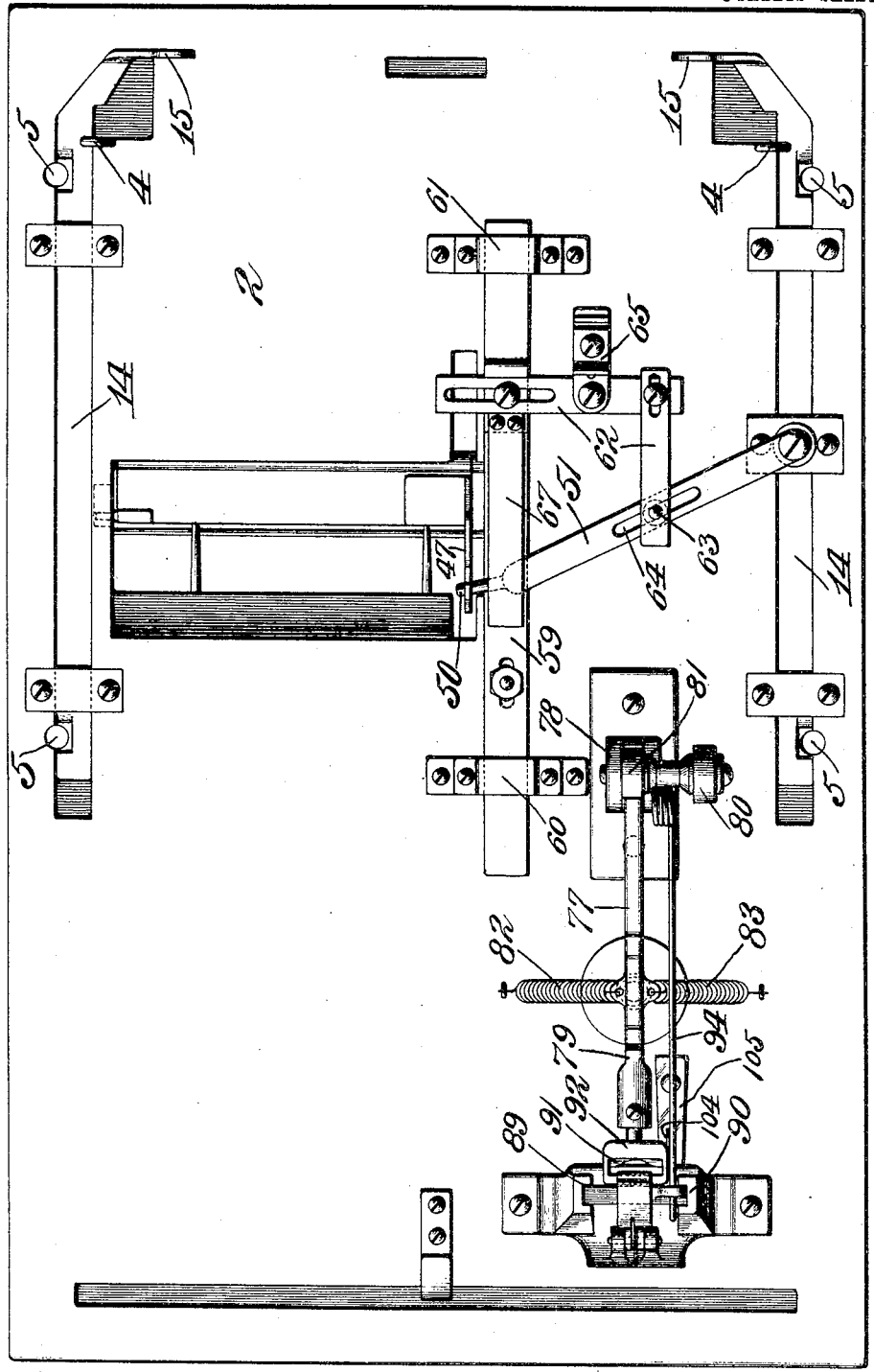

No. 792,609. PATENTED JUNE 20, 1905.
O. B. PHILLIPS.
VENDING MACHINE.
APPLICATION FILED FEB. 8, 1904.
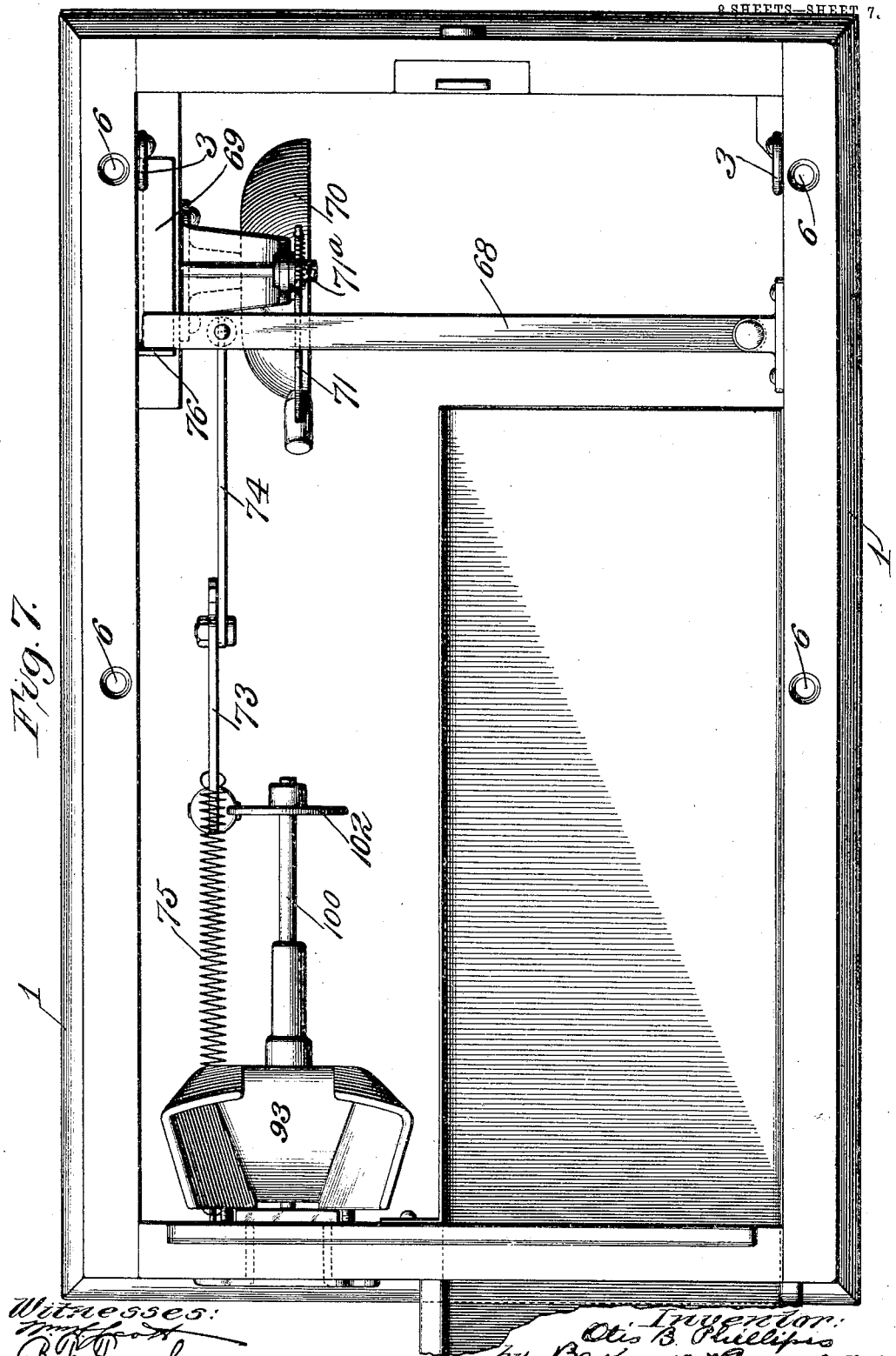

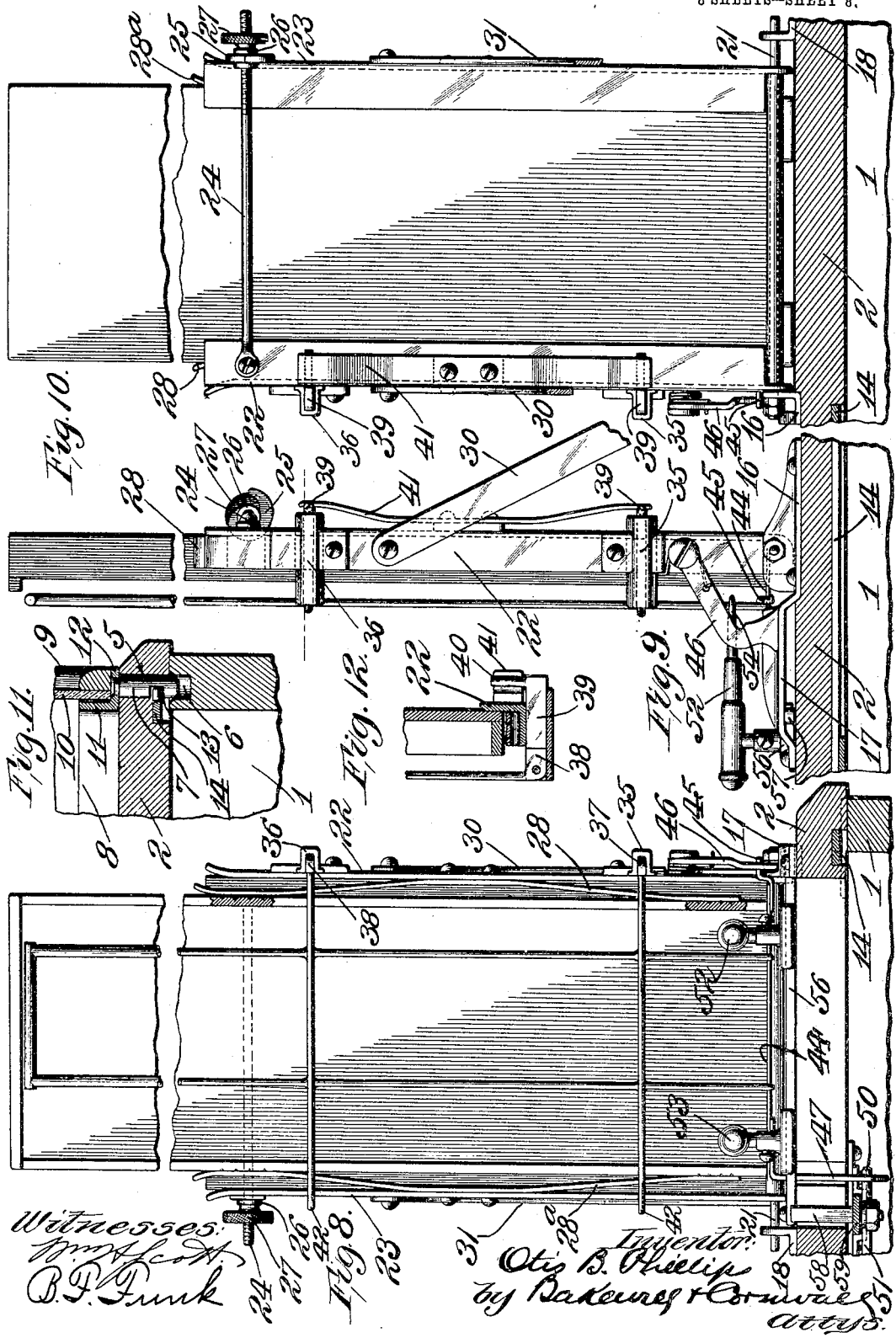

No. 792,609. Patented June 20, 1905.

UNITED STATES PATENT OFFICE.

OTIS B. PHILLIPS, OF CARBONDALE, ILLINOIS.

VENDING-MACHINE.

SPECIFICATION forming part of Letters Patent No. 792,609, dated June 20, 1905.

Application filed February 8, 1904. Serial No. 192,521.

*To all whom it may concern:*

Be it known that I, OTIS B. PHILLIPS, a citizen of the United States, residing at Carbondale, Jackson county, Illinois, have invented a certain new and useful Improvement in Vending-Machines, of which the following is a full, clear, and exact description, such as will enable others skilled in the art to which it appertains to make and use the same, reference being had to the accompanying drawings, forming part of this specification, in which—

Figure 1 is a view in front elevation of a vending-machine constructed in accordance with my invention. Fig. 2 is a vertical longitudinal sectional view on the line 2 2 of Fig. 1. Fig. 3 is an enlarged vertical sectional view through the base of the vending-machine on the line 3 3 of Fig. 1, illustrating the position of the respective parts previous to being actuated by the coin. Fig. 4 is a similar view showing the relative positions of the several parts with the coin in position to actuate them. Fig. 5 is a horizontal sectional view through the top casing and the article-receptacle on the line 5 5 of Fig. 1. Fig. 6 is a bottom plan view of the mechanism carried by the top of the base. Fig. 7 is a top plan view of the base, the cover being removed and the mechanism therein being illustrated in plan. Fig. 8 is a view in front elevation of the article-receptacle and the holder therefor. Fig. 9 is a side elevation of the holder and receptacle. Fig. 10 is a rear elevation of the receptacle and holder. Fig. 11 is a detail sectional view of the means for connecting the holder-cover and the base. Fig. 12 is a detail sectional view of the auxiliary cover for the receptacle and the support therefor, and Fig. 13 is a top plan view of the coin-chute and the valve-controlling means therefor.

This invention relates to vending-machines; and it is particularly designed to vend a given quantity of the contents of a box or receptacle to be used in connection therewith. The form illustrated in the accompanying drawings is especially designed to vend cigars or similar articles which are contained within a box or receptacle.

As is well known, the requirements of the internal revenue laws make it imperative that all cigars be vended directly from the box in which they were originally contained, and it is the purpose of this invention to provide a machine which will comply with these requirements and be capable of receiving boxes of varying sizes.

Another object of the invention is to provide means whereby a given quantity of the contents of a box may be released at a single operation and the remainder held in check.

A further object is to provide an auxiliary closure for the discharge end of the receptacle which may be intermittently operated to release a given quantity of the contents of the receptacle and which may be temporarily locked against movement.

Another object of the invention is to provide means whereby the original cover of the receptacle will be held against movement when the box is in the position to have the contents mechanically removed therefrom.

A still further object is to provide an auxiliary door capable of being held across the articles to retain them within the receptacle, but to permit of an inspection thereof.

Another object is to provide means whereby an alarm will be sounded at each operation of the mechanism.

Another object is to provide means whereby the mechanism will be locked against actuation except upon the insertion of a coin or suitable check device.

A further object is to provide a chance device which will be operated simultaneously with the operation of the mechanism; and a still further object of the invention is to provide means whereby but a single coin may be inserted into the machine at one time.

In the drawings illustrating the preferred embodiment of my invention, 1 designates a base having a removable top 2, provided with suitable means for locking it to the base. For the sake of convenience I have illustrated the cover as being secured by the hooks 3, pivotally carried by the base and engaging the screw-eyes 4. The top is provided with a plurality of openings or perforations 5 coinciding with recesses 6 in the vertical walls of the base. These coinciding openings and recesses are for the reception of depending dowel-pins 7, carried by the transparent cover 8. The transparent cover 8 comprises a plurality of corner-strips 9, engaging the edges of the transparent panels 10, which preferably consist of glass or some other suitable material. The panels 10 are secured to the strips by the angles 11, the lower of which are provided with flanges 12, to which the dowels 7 are secured. It will be observed by reference to Fig. 11 that the dowels are provided with grooves 13 for engagement with the sliding bars 14, carried by the under side of the cover 2, as clearly illustrated in Fig. 6. The hand-pieces 15 are terminally disposed on each bar and are provided for the purpose of actuating the bars, so as to engage or disengage the dowels, whereby the cover 8 will be locked to the base and its removal prevented by any unauthorized persons.

On the top 2 of the base is a vertically-swinging receptacle-holder having adjustment for boxes or receptacles of varying widths. This receptacle-holder is best illustrated in Figs. 5, 8, 9, and 10, in which 16 indicates a longitudinally-disposed casting forming one of the supports for the holder and provided with a way 17, on which the locking member carried by the holder is adapted to move and which locking member will be hereinafter described in detail. At a point suitably distant from the casting 16 is a sliding bearing 18, movable in the guide 19 and adapted to be rigidly secured thereto at any point intermediate its limits of adjustment by a set-screw 20, passing through a slot in the sliding bearing and into the guide. 21 indicates a transversely-disposed rock-shaft which is journaled in the bearing 16 and the bearing 18, the bearing 18 being slidable on said rock-shaft, so that the upstanding side bar 22 of the receptacle-holder can be moved from its companion bar 23 for the purpose of adjusting the holder to accommodate varying widths of boxes. The upper terminals of the respective sides 22 and 23 are connected by a pivoted bar 24, which is secured to one of the sides and removably engages a slotted ear or projection 25, which is engaged by a grooved collar 26, fixed with relation to the milled nut 27. Each side 22 and 23 comprises a jaw which is capable of grasping opposite sides of the box or receptacle, and each jaw is provided with resilient clamping members 28 and 28ª, whereby the movement of the jaws toward and away from each other will provide a tension against the box, so that it will be frictionally held in the holder. 29 designates a support for the holder, which is illustrated as comprising two approximately parallel arms 30 and 31, terminally pivoted to the respective sides of the holder and connected at their opposite ends by a transverse bar 32, having an intermediate notch 33 for engagement with the shank of a set-screw or other suitable device 34, whereby the arms and the holder can be clamped rigid with relation to the base top 2.

The numerals 35 and 36 designate two spaced tubular supports in which are pivotally secured the hinged terminals 37 and 38 of an auxiliary door which is capable of swinging across the face of the article-containing receptacle, whereby the articles will be securely held in said receptacle and so that they may be easily inspected. By reference to Fig. 12 it will be observed that the terminals 37 and 38 are approximately angular and that they are capable of abutting against the longitudinally-sliding plungers 39, movable in the tubular supports, said plungers having right-angularly-disposed fingers 40 to be engaged by the terminals of the flat spring 41, which is intermediately secured to one of the box-engaging jaws, so that the tension of the plunger against the angular portion of the door-terminals will be sufficient to hold it in a position approximately parallel with the bottom of the box and the free ends 42 of the door will abut against the face of the swinging box-cover, so as to hold it open. In order to assist in holding the box-cover against movement when the box or receptacle is in its operative position, I have provided a spring-finger, (designated as 43 and clearly illustrated in Fig. 5,) which can frictionally engage the edge of the cover.

44 indicates a swinging closure for the bottom of the cigar-box. It will be observed that the cigar-box to be used in this machine is preferably provided with an open end when the cover is in the position shown in Figs. 1, 2, and 5. In this position the contents of the box will rest upon the movable closure 44 and will be held in the box until a movement of the closure permits a given number to escape. The particular machine illustrated is designed to liberate one article at a time, and this is accomplished by permitting a swinging movement of the closure 44 to be accomplished by suitable mechanism to be specifically hereinafter described. This swinging closure is temporarily locked against movement. On one end of the closure 44 is a pin or projection 45, capable of being engaged by a notched locking device 46, carried by the holder, said locking device being spring-pressed to automatically engage the projection 45 when the holder is in its inoperative position or in a position to receive the box from which the articles are to be delivered. The purpose of locking this auxiliary end or closure 44 against movement is to prevent a premature removal of the contents of the receptacle containing the articles to be vended; but as soon as the holder is swung into operative position the projection 45 is released and the closure is capable of being operated by the mechanism contained within the base. Depending from the end of the closure opposite to the projection 45 is an actuating-arm 47, having a cam-slot 48 communicating with an entrance-slot 49 for the reception of a reduced end 50, carried by the transversely-moving pivoted lever 51, supported by the base-top 2. The movement of this lever in a rearward direction is sufficient to swing down the auxiliary end or closure 44, so as to permit the escape of a determined number of articles, which in this instance is one. At the same time that the closure is actuated to permit the release of the article suitable devices (designated by the reference-numerals 52 and 53) are projected toward the article-containing box and beneath the cigar adjacent to the one being released, so as to hold the remaining ones against downward movement and prevent the release of more than one. These devices 52 and 53 each consists of a tubular member with a spring-pressed finger 54, the spring 55 being interposed between the end of the finger and the rear of the tube, so that when the finger comes in contact with the box or the article therein a sudden force of impact will be avoided. These devices are transversely adjustable on a bar 56, at one end of which is a lug or projection 57, guided by the guide 17 of the casting 16. The other end of the bar 56 carries a fixed depending projection 58, which is rigid with the longitudinally-disposed bar 59, mounted in suitable bearings 60 and 61 and in engagement with the laterally-movable lever 51 through the medium of a bell-crank lever 62, one arm of which is rigidly attached to the sliding bar 59 and the other arm carrying a pin 63, working in a slot 64 in the lever 51. Pivotally secured to the bell-crank lever 62 is a connection in the form of a clip 65, capable of engaging or straddling a horizontally-moving actuating-lever, which will be hereinafter described. The lever 51 is held in its proper relative position between the sliding bar 59 and a guide-bar 67, carried thereby, and the reduced projection 50 thereon is capable of engagement with the slot 48 just so long as the parts are in position for operation. If it is desirable to remove the article-containing box, so that a new box can be substituted, the holder-support is released and the holder swung down to an approximately horizontal plane, and at the same time the arm 47 is thrown out of engagement with the reduced end 50 and temporarily released therefrom. During the operation of releasing the arm 47 from the reduced end 50 the notch-locking part 46 has been caused to engage the projection 45 on the hinged closure 44, temporarily locking it in such a position that the article within the box cannot be released. However, as soon as the holder is again thrown into operative position the angular end of the locking part will contact with the upper face of the guide 17, so as to be thrown out of engagement with the projection 45, leaving the closure 44 free to be again operated, the arm 47 in the meantime having engaged the projection 50.

I will now describe the mechanism for actuating the bar 59 and the mechanism controlled thereby.

Extending substantially the entire width of the base 1 and adjacent to the top thereof is a pivoted bar 68, which is straddled by the clip 65, so that a movement of the transverse bar 68 will impart a movement to the said clip and to the bell-crank lever carrying it. The end of the bar or lever 68 distant from its point of connection with the base rests upon a guide-flange 69, suitably supported in the base and which will prevent any sagging of the bar 68.

70 designates a bell, and 71 the tappet therefor, which is supported within the casing, and on the pivot 71$^a$ thereof is a spring-pressed dog 72, which is capable of engagement with the bar 68 when it moves in a rearward direction, so as to raise the tappet and sound the alarm. However, the bar 68 will be permitted to pass back over the dog on its return movement after the mechanism has been actuated.

73 is a vertically-disposed pivoted lever secured to the bottom of the base and is provided with a bifurcated free end in which is secured one end of a link 74, the other end of which engages the lever 68. The coil-spring 75 is terminally secured to the front end of the hollow base 1 and to the lever 73, so that the normal tendency of movement of said lever will be in the direction of the forward part of the hollow base, the tension of the spring being sufficient to draw the lever 68 against the stop 76 on the end of flange 69. Upon the position of the lever 73 will depend the position of all of the operating parts heretofore described, and for this reason I will term the lever 73 a "master-lever." This lever 73 is actuated by suitable controlling mechanism, illustrated as comprising a bell-crank lever and a plunger. By reference to Figs. 3 and 4 it will be noticed that the bell-crank lever (designated by the reference-numeral 77) is pivoted to a suitable bracket 78, carried by the top of the base, the horizontal arm 79 of said lever being adapted to be engaged by a plunger under conditions to be hereinafter described, so that a downward movement of the arm 79 will cause the antifriction-roller 80, carried by the vertical arm 81 of the lever 77, to contact with the lever 73 and move it toward the rear of the machine, and through the instrumentality of the link and the transversely-movable lever connected thereto the delivery mechanism will be actuated, as heretofore described. As soon as pressure is relieved on the arm 79 the lever 77 will be returned to its normal position, as shown in Fig. 3, by the springs 82 and 83, and the lever 73 will be retracted to its normal position in an obvious manner, at the same time resetting the delivery mechanism.

A suitable coin-controlled mechanism is employed in connection with this device, whereby the mechanism can only be actuated upon the insertion of a coin or suitable check. In order to accomplish this, a coin-chute 85 is provided in the top of the base of the casing, which coin-chute is formed with a curved floor 86, terminating adjacent to the inclined slot 87 in a vertical reciprocating part 88, which is in the form of a piston-head. This reciprocating part 88 is guided in the grooved approximately parallel guides 89 and 90, which depend from the top of the base, as fully illustrated in Figs. 3, 4, and 6. The slot 87 is designed to aline with a similar inclined slot 91 in a check-receiving part 92, carried by the end of the arm 79 of the lever 77, so that when the coin is dropped in the chute 85 it will be deflected by the floor thereof into the slot 87, whereby it will be caused to engage with the slot 91, which latter slot is of less diameter than the diameter of the check.

In Fig. 3 I have illustrated the normal potions of the several parts, the check being illustrated as being in position to permit the operation of the machine, so that by depressing the plunger 84 the arm 79 of the lever 77 can be forced toward the bottom of the base until it reaches the limit of its stroke, as shown in Fig. 4, whereby the delivery mechanism will be actuated. As soon as the check is released to be deposited in the coin-hopper 93 the arm 79 will be returned to its normal position by the springs 82 and 83, and the plunger, together with its slotted part, will be returned by the spring 94, one end of which is connected to the casting 78 and the other end suitably engaging the part 88.

Means is provided whereby a full stroke of the piston is necessary in order to actuate the mechanism so as to guard against the fraudulent operation thereof. The preferred form of the means for preventing fraudulent operation is illustrated in Figs. 3 and 4, in which a pivoted spring-pressed dog 95 is employed, said dog having a plurality of graduations or serrations 96 along its inner face and adjacent to the check device. The spring 97 will have a tendency to force this dog toward the coin or check, so that when the check is in the position illustrated in Fig. 3 a slight depression of the plunger 84 will cause the edge of the check distant from the edge engaging the slot 91 to contact with one of the serrations in the dog and prevent a return movement of the arm 79 until the plunger has been forced through its full stroke. In Fig. 4 I have illustrated the positions of the several parts just previous to the release of the coin, and by reference to Figs. 3 and 4 it will be obvious that as the plunger is depressed the coin or check will gradually be withdrawn from the slot 91 until it is entirely out of contact with any part of the lever 77, in which event it will drop into the hopper 93 and be deposited in the way 98 opposite the window 99 in the front of the casing, in which position it will be held by the spring-pressed plunger 100. The succeeding operating of the plunger will permit the coin to be released by the plunger 100, through the medium of a depending finger 101, carried by the bell-crank lever 77, which finger is capable of contacting with an abutment 102 on the plunger, so as to draw it out of contact with the coin, but release it, so as to be in a position to obstruct the passage of a coin then passing through the machine. Thus it will be obvious that one coin will at all times be visible through the window 99.

It is also the purpose of this invention to provide means to guard against the insertion of a multiplicity of coins at one time, and in order to accomplish the desired result a hinged valve 103 is provided near the entrance of the coin-chute, the pintle of which is formed with a terminal arm 104 to be engaged by a spring 105, carried by the top of the base, which spring has a tendency to bear down upon the arm and close the coin-chute, as illustrated in Fig. 4. The spring 105 being weaker than the spring 94 it will be apparent that when the parts are in their normal positions the plunger-head 88 will retain the spring flush against the under side of the base, as shown in Fig. 3, in which position the valve will not obstruct the coin-chute. However, as soon as the plunger is moved away from the spring the valve will be actuated to close the chute, and thereby prevent the introduction of additional coins.

Means is provided whereby a chance device can be actuated automatically by the operation of the delivery mechanism, and this chance device is illustrated as comprising a gravitating piston 106, depending from a sleeve-casting 107 in the top of the machine and carrying at its upper terminal a table (designated by the numeral 108) and which is inclosed by a transparent cover 109. A suitable number of game-pieces 110 are carried by the table and are designed to be agitated by the sudden movement of the table resulting from the force of impact of the arm 79 against the plunger 106.

While the device has been described as particularly applicable to use for vending cigars, it is obvious that other articles—such as cigarettes, lead-pencils, stick-candy, and cylindrical packages—may be vended without materially altering the construction of the machine, and I therefore do not limit myself to the specific use of vending cigars.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. In a vending-machine, an article-containing-receptacle holder having means for providing a closure at the discharge portion of the receptacle, and means for controlling said closure means whereby a determined quantity of the articles within the receptacle may be released, said means including an actuating-arm engaging a cam-shaped slot in a part of said closure means; substantially as described.

2. In a vending-machine, an article-containing-receptacle holder having means for providing a closure at the discharge portion of the receptacle, and means for actuating said closure to release a determined quantity of the contents of the receptacle, said means including a depending plate provided with a cam-slot, a lever terminally engaging the slot, and means for actuating the lever; substantially as described.

3. In a vending-machine, an article-containing-receptacle holder having means for providing a closure at the discharge portion of the receptacle, and means for temporarily locking the closure against movement, said article-containing-receptacle holder having a swinging movement and provided with means for carrying the closure means; substantially as described.

4. In a vending-machine, a pivoted means for holding articles to be vended, a releasing means carried by the pivoted means, and means for temporarily locking the last-named means against movement; substantially as described.

5. In a vending-machine, an article-containing-receptacle holder having means movable with the holder, for releasing the articles to be vended, and means for actuating the first-named means; substantially as described.

6. In a vending-machine, an article-containing-receptacle holder having an article-releasing means, and yielding means for temporarily locking the releasing means against movement; substantially as described.

7. In a vending-machine, an article-holder, means for releasing the articles, and a yielding means actuated by the holder for locking the releasing means against movement; substantially as described.

8. In a vending-machine, an article-holder, means for releasing the articles, and a yielding means movable with and actuated by the holder for locking the releasing means against movement; substantially as described.

9. In a vending-machine, an article-holder movable into and out of an operative position, means for releasing the articles from said holder, said means having a downward swinging movement from a horizontal to a vertical plane, and an upward swinging movement from a vertical to a horizontal plane, means for temporarily locking said releasing means in its horizontal position to prevent downward swinging movement thereof when the article-holder is in its operative position, and means for automatically releasing the locking means to permit the downward swinging movement of the releasing means when the article-holder is in its inoperative position; substantially as described.

10. In a vending-machine, an article-holder movable into and out of an operative position, means for releasing the articles and having a swinging movement into and out of a horizontal plane, means for actuating said releasing means to permit said releasing means to swing out of the horizontal plane to release the articles only when the holder is in its operative position, and means for temporarily locking the releasing means in its horizontal position; substantially as described.

11. In a vending-machine, a vertically-swinging receptacle-holder, a mechanically-controlled hinged receptacle-closure, and means for actuating said closure; substantially as described.

12. In a vending-machine, a vertically-swinging receptacle-holder, a hinged receptacle-closer carried by the holder, and means for actuating said closer; substantially as described.

13. In a vending-machine, a vertically-swinging receptacle-holder, a mechanically-controlled hinged receptacle-closure, means for actuating said closure, and a pivoted locking means for temporarily engaging the closure to lock it against an independent movement with relation to the holder; substantially as described.

14. In a vending-machine, means for holding the articles to be vended, means for releasing the articles, an actuating means carried by the releasing means and having a cam-slot, and means for engaging the cam-slot of the actuating means and movable in the slot to control the actuating means; substantially as described.

15. In a vending-machine, a receptacle-holder, a hinged closer for the receptacle-holder, a slotted actuating means for actuating the closer to release or retard the contents of the receptacle, means for engaging the slotted actuating means, and means for automatically releasing the actuating means from engagement with its actuating means, the above-named receptacle-holder being so mounted as to permit of the release of the slotted actuating means from its actuating means; substantially as described.

16. In a vending-machine, a receptacle-holder, a closure for the receptacle-holder, means for actuating the closure, a locking device for the closure, and means for automatically releasing the actuating device and for throwing the locking means into engagement with the closure; substantially as described.

17. In a vending-machine, an adjustable receptacle-holder, a closure for the receptacle-holder, means for actuating the closure, a locking device for the closure, and means for automatically releasing the actuating device and for throwing the locking means into engagement with the closure; substantially as described.

18. In a vending-machine, a transversely-adjustable receptacle-holder, a closure for the receptacle-holder, means for actuating the closure, a locking device for the closure, and means for automatically releasing the actuating device and for throwing the locking means into engagement with the closure; substantially as described.

19. In a vending-machine, a pivoted receptacle-holder having a vertical, swinging movement, and yielding clamping means for the receptacle-holder; substantially as described.

20. In a vending-machine, an adjustable, pivoted, vertically-swinging receptacle-holder having a yielding clamping means therefor; substantially as described.

21. In a vending-machine, a receptacle-holder having yielding clamping means, and a tension device carried by the receptacle-holder to engage the receptacle; substantially as described.

22. In a vending-machine, a receptacle-holder having means for yieldingly frictionally engaging the lid of a receptacle whose lid is hinged thereto; substantially as described.

23. In a vending-machine, a receptacle-holder, a receptacle in the holder provided with a lid having swinging movement in a horizontal plane, and means for preventing movement of the lid of the receptacle; substantially as described.

24. In a vending-machine, a receptacle-holder having a yielding finger for frictionally engaging the lid of a receptacle whose lid is hinged thereto and capable of moving in a horizontal plane; substantially as described.

25. In a vending-machine, a receptacle-holder, and a spring-controlled auxiliary door carried by the holder; substantially as described.

26. In a vending-machine, a receptacle-holder, an auxiliary lid carried by the holder and having means for engagement with a door on the receptacle to hold it open; substantially as described.

27. In a vending-machine, a receptacle-holder, door-supports carried by the holder, and a door pivoted in the supports; substantially as described.

28. In a vending-machine, a receptacle-holder, door-supports carried by the holder, a door pivoted in the supports, and spring means carried by the supports for holding the door across the receptacle; substantially as described.

29. In a vending-machine, a receptacle-holder, door-supports carried by the holder, a door pivoted in the supports, and sliding plungers carried by the supports; substantially as described.

30. In a vending-machine, a receptacle-holder, door-supports carried by the holder, a door pivoted in the supports, sliding plungers carried by the supports, and a spring bearing against the plungers; substantially as described.

31. In a vending-machine, a receptacle-holder, means for releasing the contents of the receptacle, and yielding means independent of the releasing means and of the holder for controlling the quantity of the contents to be released from the receptacle; substantially as described.

32. In a vending-machine, a receptacle-holder, means for releasing the contents of the receptacle, and means simultaneously actuated but independent of and separate from the releasing means of the holder for controlling the quantity of the contents to be released from the receptacle; substantially as described.

33. In a vending-machine, a receptacle-holder, means for releasing the contents of the receptacle, and means independent of the releasing means and of and separate from the holder for controlling the quantity of the contents to be released from the receptacle and having a sliding movement toward and away from the receptacle; substantially as described.

34. In a vending-machine, a receptacle-holder, means for releasing the contents of the receptacle, means independent of the releasing means and of and separate from the holder for controlling the quantity of the contents to be released from the receptacle, said contents-controlling means comprising tubular members, springs in the tubular members, and sliding fingers actuated by the springs; substantially as described.

35. In a vending-machine, the combination with a receptacle-holder, means carried by the holder for releasing the articles in the receptacle, means independent of the means carried by the holder for governing the quantity of the articles released, and a lever mechanism common to the governing and releasing means; substantially as described.

36. In a vending-machine, the combination with a receptacle-holder, means carried by the holder for releasing the articles in the receptacle, means for governing the quantity of the articles released, a lever mechanism common to the governing and releasing means, a bell-crank lever, and mechanism interposed between the bell-crank lever and the lever mechanism; substantially as described.

37. In a vending-machine, means for holding an article-containing receptacle, means for releasing the articles within the receptacle, and a pivoted lever having a free and removable end terminally engaging the releasing means, and means for actuating the lever; substantially as described.

38. In a vending-machine, a bell-crank lever, means for moving the bell-crank lever, a laterally-movable bar controlled by the lever, a longitudinally-movable arm actuated by said laterally-movable bar, and means controlled by the longitudinally-movable lever to release a portion of the contents of the vending-machine; substantially as described.

39. In a vending-machine, a bell-crank lever, and means for actuating said lever, a laterally-movable bar controlled by the lever, a longitudinally-movable arm actuated by said laterally-movable bar, means for controlling the quantity of the articles to be released, means for releasing the articles, and connection between the controlling and releasing means and the longitudinally-movable arm; substantially as described.

40. In a vending-machine, a bell-crank lever, a plunger for actuating the bell-crank lever, a laterally-movable bar controlled by the lever, a longitudinally-movable arm actuated by said laterally-movable bar, means for controlling the quantity of the articles to be released, means for releasing the articles, and connection between the controlling and releasing means and the longitudinally-movable arm, substantially as described.

41. In a vending-machine, a delivery mechanism, devices carried by the machine for controlling the quantity of the articles delivered and adjustable toward and away from each other; substantially as described.

In testimony whereof I hereunto affix my signature, in the presence of two witnesses, this 22d day of January, 1904.

OTIS B. PHILLIPS.

Witnesses:
S. W. DUNAWAY,
E. T. STEEL.